July 5, 1927.

C. N. BERGMANN 1,635,159

RECEPTACLE FILLING APPARATUS

Filed Feb. 19, 1926   3 Sheets-Sheet 1

INVENTOR.
Christian N. Bergmann
BY O. M. Clarke
ATTORNEY

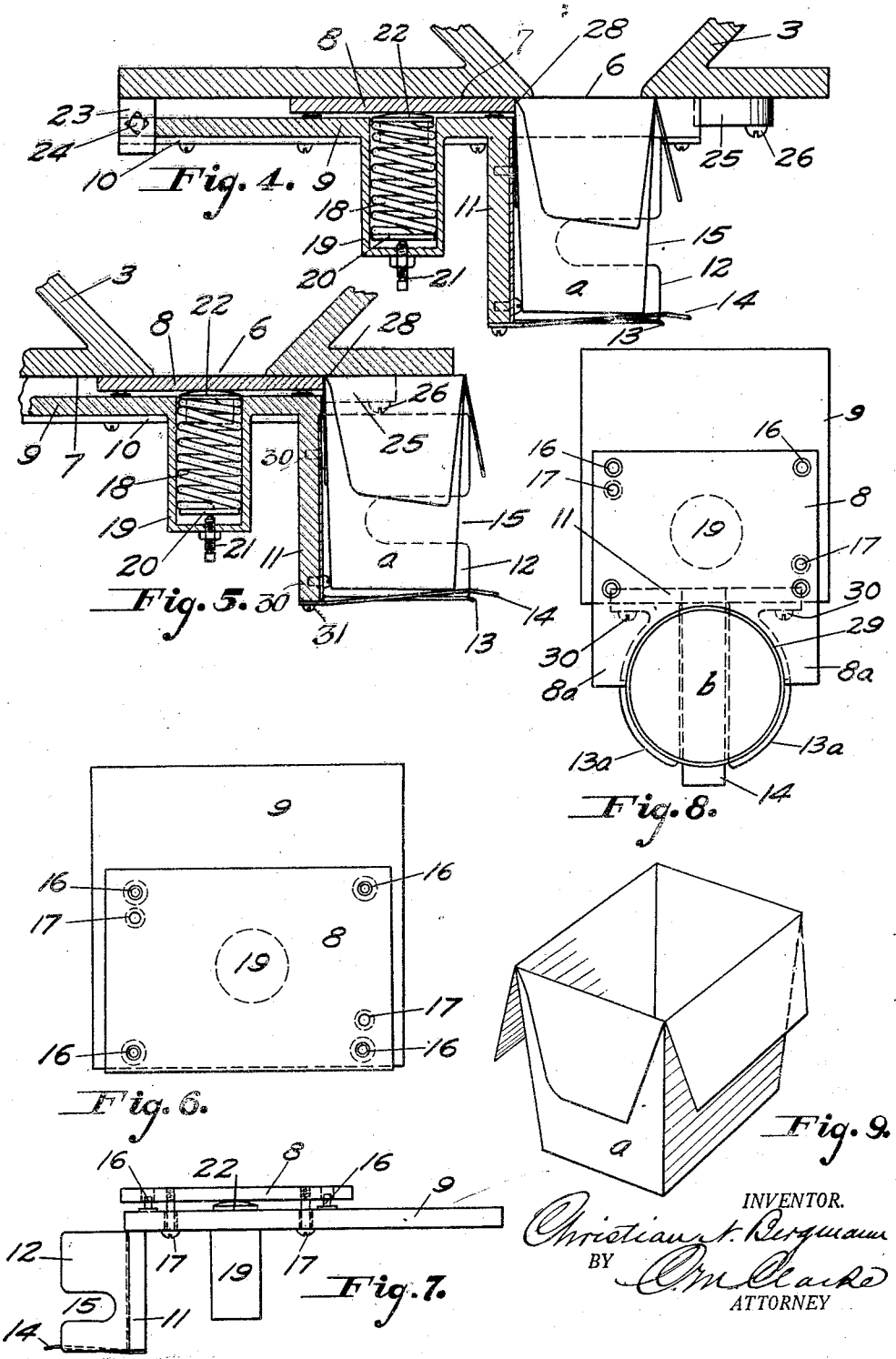

July 5, 1927.
C. N. BERGMANN
1,635,159
RECEPTACLE FILLING APPARATUS
Filed Feb. 19, 1926    3 Sheets-Sheet 3
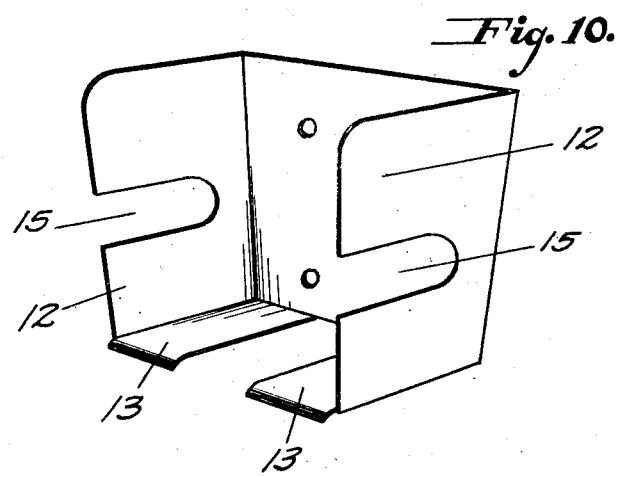
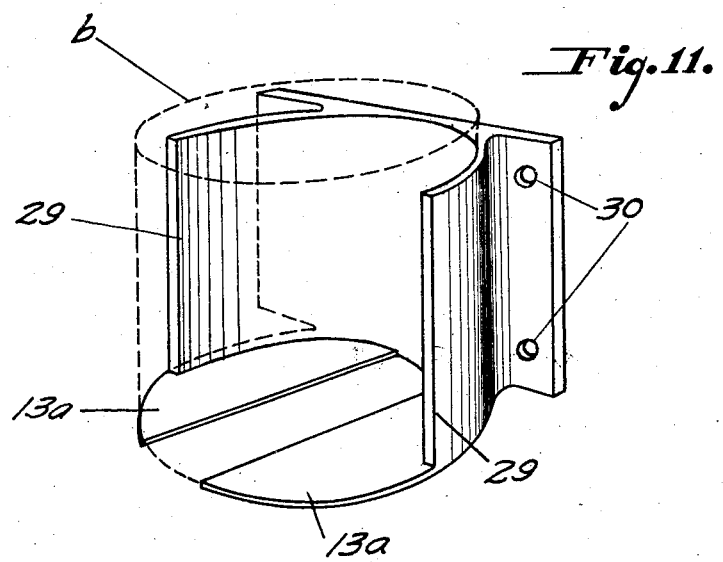
INVENTOR.
Christian N. Bergmann
BY
ATTORNEY Patented July 5, 1927.

1,635,159

UNITED STATES PATENT OFFICE.

CHRISTIAN N. BERGMANN, OF PITTSBURGH, PENNSYLVANIA, ASSIGNOR TO BERGMANN PACKAGING MACHINE COMPANY, OF PITTSBURGH, PENNSYLVANIA, A CORPORATION OF DELAWARE.

RECEPTACLE-FILLING APPARATUS.

Application filed February 19, 1926. Serial No. 89,337.

My invention refers to an improvement in machines for packaging material in receptacles of the unit container type, so as to provide a completely filled box, cup, or other holding unit, as hereinafter described.

The invention has in view to provide means for placing an open top container underneath a storage or supply hopper, by a sliding holder having a co-acting sliding plate or door for opening and closing an outlet port, and for presenting the open top of the container underneath the hopper for filling and for removal when filled, with a cut off of the supply.

The object in view is to provide a machine which may be operated by hand to place a receptacle in a holder by which it is supported and may be pushed backwardly for filling and then withdrawn and the operation repeated.

A further object is to insure the filling of the container flush full, even with its upper edge, by a wiping action in removing it across underneath the lower flat face of the hopper. Also, to retain a full measured content in the container without slopping or loss of the contents, as hereinafter described.

One preferred embodiment of the invention is shown in the accompanying drawings in which:—

Fig. 4 is an enlarged sectional view similar to Fig. 1 showing the receptacle in filling position;

Fig. 5 is a similar view with the receptacle in its outer position;

Fig. 6 is a plan view of the sliding cut-off plate and the upper supporting frame plate;

Fig. 7 is a detail side view of the sliding cut-off plate and receptacle support detached;

Fig. 8 is a plan view similar to Fig. 6, but showing a modified construction adapting the holder to operation with a circular or cylindrical cup;

Fig. 9 is a perspective detail view of a rectangular container or box;

Fig. 10 is a perspective detail view of the holder as used for a rectangular container; and Fig. 11 is a similar view showing a holder adapted for a cylindrical container.

Figure 1:
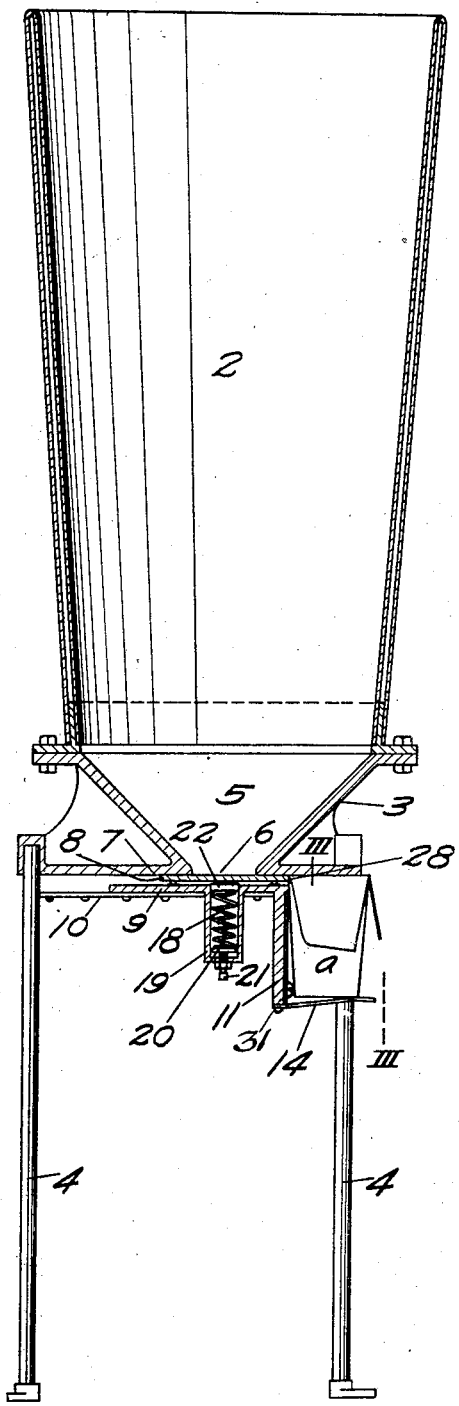
Fig. 1 is a central vertical sectional view through the machine.
Figure 2:
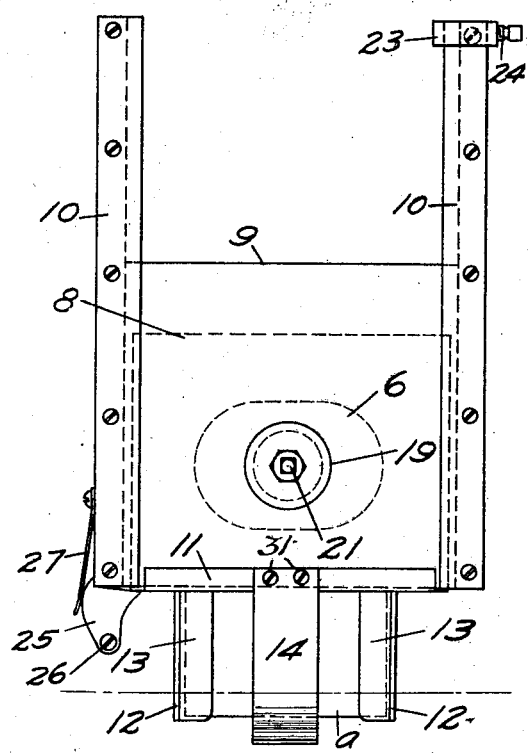
Fig. 2 is an enlarged under plan view.
Figure 3:
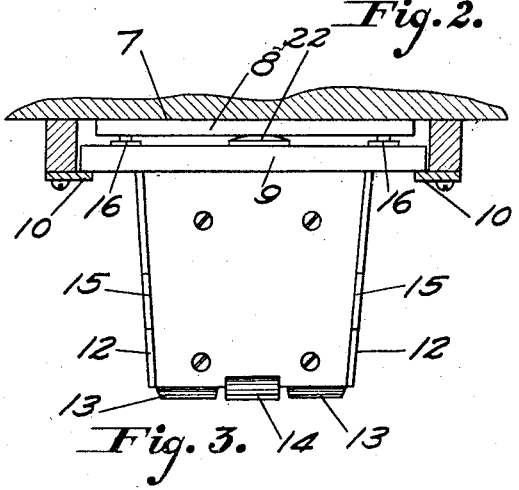
Fig. 3 is a similarly enlarged vertical sectional view on the line III—III of Fig. 1 showing the receptacle holding cavity.

The machine as a whole comprises an upper hopper or reservoir 2 of any suitable construction mounted upon and extending above a delivery base portion 3. Said base portion is mounted by suitable legs or supporting frame 4 for proper elevation above the floor surface and is preferably made ot a casting.

The interior of base 3 is provided with an inwardly tapering or sloping delivery cavity 5 terminating in a discharge opening or port 6 through which the contents are delivered by gravity, in measured amounts at each time that such opening is placed in circulation with a lower receiving receptacle. For such purpose, the bottom of frame 3 is planed off to provide a smooth bearing surface 7 for a slide plate 8.

Said plate forms a portion of the reciprocable plate or frame 9 which is mounted by its side edges in supporting slides 10—10 depending from the main base. Frame 9 is provided at its front with a receiving cavity or holding portion for the receptacle a. In the construction shown the frame extends downwardly by a wall 11 to which is secured in any suitable manner, a guiding and holding casing 12 having retaining portions extending forwardly at each side.

Bottom extensions 13 are also preferably provided, between which is a clearance opening for a receptacle supporting spring 14 secured at its rear end to the lower edge of wall 11. The side walls 12 are cut out as at 15 for clearance of the thumb and finger of the operator in placing the receptacle a in position, or in removal when filled.

Plate 8 is mounted for limited vertical movement above the frame plate 9 by means of guiding pins 16 fitting loosely into registering openings in plate 8, as in Fig. 7.

Additional holding screws or studs 17 are inserted upwardly through clearance holes in plate 9 and tapped into upper plate 8, retaining it by the heads of the screws against loss or removal when the entire frame is withdrawn from the machine.

As thus mounted, plate 8 is free to move vertically to a limited extent above plate 9 between it and the under-bearing face 7.

For the purpose of pressing the plate upwardly against such face at all times, I provide a spring 18 mounted in a housing 19 depending below the main slide plate 9 and having a lower supporting plate 20 and an adjusting set screw 21 for controlling the pressure of the spring.

At its upper end, spring 18 is provided with a rounded stud 22 carried by the spring and pressing against the upper slide plate 8, holding it at all times tightly against the under face 7. By such construction, as the frame 11 is pushed inwardly or drawn outwardly, the plate 8 will maintain its sliding close contact against the face, opening the outlet cavity 6, as in Fig. 4, when thrust inwardly for charging, and closing it when drawn outwardly with the filled receptacle, as in Fig. 5.

For the purpose of positively limiting inward movement of the sliding frame, a stop 23 is mounted by a set screw 24 at the inner end of one or both slides 10, so as to positively locate the receptacle $a$ in receiving register with port 6. Likewise a retaining dog 25 is pivoted to the under side of the main frame by screw 26, and is held inwardly in arresting position to engage the front corner of the sliding frame by a spring 27. By pressing the dog outwardly against the spring, the entire sliding frame may be released and withdrawn for cleaning, repair, or other purposes.

The construction and operation of the invention will be readily understood and appreciated from the foregoing description. A receptacle $a$ being inserted between the sides 12 on spring 14, and against the back portion of the receptacle cavity, is thus positively located and continuously pressed upwardly by the spring against the under face 7. The slide then being thrust inwardly, the receptacle will be filled, and upon reverse movement, the entirely filled receptacle will slide forwardly while held against such flat surface, and the following plate 8 will close the cavity against escape of any material. As shown, the upper inner edge of the receptacle bears at all times against the front edge portion of plate 8, as at 28, and the side edges of the receptacle extend laterally beyond opening 6, and bear upwardly against face 7, effectually sealing the parts against escape of any material.

In removal, the contents of the receptacle fill it flush with the top, with a smooth severance surface as the receptacle is withdrawn against the edge of port 6 and the smooth surface 7, while constantly pressing upwardly against said surface.

After thus being filled, receptacle $a$ may be removed by the finger and thumb, grasping it at each side through clearance openings 15, when the flaps may be closed over the top and the container placed in a refrigerating can or elsewhere, as desired.

Fig. 8 shows the application of the invention to a round or cylindrical receptacle $b$ mounted on the spring 14, between the receiving semi-circular sides 29 and side portions of the slide plate $8^a$. In such case, a bracket as shown in Fig. 11, is secured by screw holes 30 and supporting shelves $13^a$ are provided, one at each side of the central spring opening and the spring therein. The spring, as stated, extends outwardly from the back wall of frame 11, and is secured thereto by screws 31 or in any other suitable manner.

It will also be obvious that the machine may be adapted to or designed for the reception of any particular shape of receptacle which is capable of being held upwardly by its open top against the under side of the discharge hopper, and in register with its outlet opening 6, in connection with the sliding spring-pressed sealing plate 8, as disclosed. Also, that the sliding receptacle holder may be operated by hand as described or by any suitable actuating mechanism.

What I claim is:

1. The combination with a supply reservoir having a bottom outlet opening and a plane under face extending beyond the opening, of a slidably mounted receptacle support having a valve plate fitting against said under face, and resilient means for holding an open top receptacle with its upper edges up against the plane under face of the reservoir bottom.

2. The combination with a supply reservoir having a plane under face and an outlet opening therethrough, of a slidably mounted receptacle support having a horizontal valve plate supporting frame and a loosely mounted valve plate mounted on said frame and fitting against said under face.

3. The combination with a supply reservoir having a plane under face and an outlet opening therethrough, of a slidably mounted receptacle support having a resiliently mounted valve plate fitting against said under face.

4. The combination with a supply reservoir having a plane under face and an outlet opening therethrough, of a slidably mounted receptacle support having a valve plate fitting against said under face, and an upwardly pressing spring, adapted to engage the bottom of the receptacle.

5. The combination with a supply reservoir having a bottom outlet opening and a plane under face extending beyond the opening, of a slidably mounted receptacle support having a valve plate fitting against said under face, and an attached depending bracket for the receptacle.

6. The combination with a supply reservoir having a plane under face and an outlet opening therethrough, of a slidably mounted receptacle support having a valve plate fitting against said under face, and a depending bracket for the receptacle having opposite receptacle-engaging sides.

7. The combination with a supply reservoir having a plane under face and an outlet opening therethrough, of a slidably mounted receptacle support having a valve plate fitting against said under face, and a depending bracket for the receptacle having opposite receptacle-engaging sides provided with finger clearance openings.

8. The combination with a supply reservoir having a plane under face and an outlet opening therethrough, of a slidably mounted receptacle support having a valve plate fitting against said under face, and a depending bracket for the receptacle having a supporting bottom and an upwardly pressing spring.

9. The combination with a supply reservoir having a plane under face and an outlet opening therethrough, of a slidably mounted receptacle support having a valve plate fitting against said under face, and a depending bracket for the receptacle having an apertured bottom and a spring extending upwardly through the aperture therein.

10. The combination with a supply reservoir having a plane under face and an outlet opening therethrough, of a slidably mounted receptacle support having a resiliently mounted valve plate fitting against said under face, and a rear stop for limiting sliding movement of the receptacle support.

11. The combination with a supply reservoir having a plane under face and an outlet opening therethrough, of a slidably mounted receptacle support having a resiliently mounted valve plate fitting against said under face, and a front locking dog for limiting sliding movement of the receptacle support.

12. The combination with a supply reservoir having a plane under face and an outlet opening therethrough, of a slidably mounted frame provided with a valve plate adapted to bear up against said under face, and a movable front receptacle support having a spring adapted to press a receptacle upwardly against said face.

13. The combination with a supply reservoir having a plane under face and an outlet opening therethrough, of a slidably mounted frame provided with a valve plate adapted to bear up against said under face, and a front receptacle support carried by said frame having a spring adapted to press a receptacle upwardly against said face and in close engagement against the front edge of the valve plate.

14. A slidable receptacle support for filling mechanism consisting of a horizontally disposed base having a downwardly extending front wall, a receptacle support mounted on said wall having an open front and a lower supporting spring, and a valve plate mounted on said base with an intervening upwardly pressing spring.

15. A slidable receptacle support for filling mechanism consisting of a horizontally disposed base having a downwardly extending front wall, a receptacle support mounted on said wall having an open front and a lower supporting spring, a valve plate mounted on said base with an intervening upwardly pressing spring, and means for varying the pressure of the spring.

16. A slidable receptacle support for filling mechanism consisting of a horizontally disposed base having a downwardly extending front wall, a receptacle support mounted on said wall having an open front and a lower supporting spring, and a valve plate mounted on said base with an intervening upwardly pressing spring, said receptacle support having side walls provided with finger clearance openings.

17. Receptacle filling apparatus comprising a downwardly discharging reservoir having an outlet opening and a flat under face, and a slidably mounted receptacle holder provided with a cut off plate and means for holding a receptacle against the flat under face of the reservoir.

18. Receptacle filling apparatus comprising a downwardly discharging reservoir having an outlet opening and a flat under face, and a slidably mounted receptacle holder provided with a cut off plate having a front bearing edge for contact with the adjacent edge of a container, and means for holding a receptacle against the flat under face of the reservoir and against the edge of the cut off plate.

19. In combination with a slidable frame having an upper plate, a relatively movable valve plate thereon provided with limiting studs loosely engaging the frame plate, interengaging guide studs and holes in said plates, and a spring in the sliding frame exerting upward pressure against the valve plate.

In testimony whereof I hereunto affix my signature.

CHRISTIAN N. BERGMANN.